(12) United States Patent
Gomez

(10) Patent No.: US 10,774,413 B2
(45) Date of Patent: Sep. 15, 2020

(54) LOW PRESSURE INDUCTION CARBURIZATION

(71) Applicant: HONEYWELL INTERNATIONAL INC., Morris Plains, NJ (US)

(72) Inventor: Alan J. Gomez, Phoeniz, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 677 days.

(21) Appl. No.: 14/938,024

(22) Filed: Nov. 11, 2015

(65) Prior Publication Data
US 2017/0130316 A1 May 11, 2017

(51) Int. Cl.
| | | |
|---|---|---|
| C23C 8/04 | (2006.01) | |
| C23C 8/22 | (2006.01) | |
| F16H 55/06 | (2006.01) | |
| F16H 55/17 | (2006.01) | |
| F27B 5/04 | (2006.01) | |
| C21D 9/32 | (2006.01) | |
| C21D 1/74 | (2006.01) | |
| C21D 1/42 | (2006.01) | |

(Continued)

(52) U.S. Cl.
CPC ............ *C23C 8/04* (2013.01); *C21D 1/42* (2013.01); *C21D 1/74* (2013.01); *C21D 9/32* (2013.01); *C23C 8/22* (2013.01); *F16H 55/06* (2013.01); *F16H 55/17* (2013.01); *F27B 5/04* (2013.01); *F27D 11/06* (2013.01); *F27D 11/12* (2013.01); *Y02P 10/253* (2015.11)

(58) Field of Classification Search
CPC .................................. C23C 8/04; C21D 9/32

USPC ......................................................... 148/213
See application file for complete search history.

(56) References Cited

U.S. PATENT DOCUMENTS

| | | | | |
|---|---|---|---|---|
| 5,851,478 A | * | 12/1998 | Iizuka | ................. B29C 49/6481 264/520 |
| 6,059,898 A | | 5/2000 | Fisher et al. | |
| 8,123,873 B2 | | 2/2012 | Mizuno et al. | |

(Continued)

FOREIGN PATENT DOCUMENTS

| | | |
|---|---|---|
| CN | 101130852 A | 2/2008 |
| CN | 101158046 A | 4/2008 |

(Continued)

OTHER PUBLICATIONS

Extended EP Search Report for Application No. 16195640.4-1362 dated Mar. 16, 2017.

(Continued)

*Primary Examiner* — Weiping Zhu
(74) *Attorney, Agent, or Firm* — Lorenz & Kopf, LLP

(57) ABSTRACT

A method for selective carburization of an article using low pressure induction carburization includes: providing or procuring an article including a surface; subjecting the article to directed induction heating, wherein a first portion of the surface of the article is inductively heated to a temperature that exceeds a carburizing temperature, while a second portion of the surface of the article remains at a temperature below the carburizing temperature; and simultaneously with subjecting the article to directed induction heating, subjecting the article to low pressure carburization, thereby selectively carburizing the first portion of the surface of the article while not carburizing the second portion of the surface of the article.

13 Claims, 4 Drawing Sheets

(51) Int. Cl.
*F27D 11/06* (2006.01)
*F27D 11/12* (2006.01)

(56) References Cited

U.S. PATENT DOCUMENTS

| | | |
|---|---|---|
| 8,273,188 B2 | 9/2012 | Yoshida |
| 8,430,974 B2 | 4/2013 | Taniguchi et al. |
| 2009/0266449 A1 | 10/2009 | Ohbayashi et al. |
| 2013/0312560 A1* | 11/2013 | Obayashi ............... C21D 1/10 74/434 |
| 2013/0319154 A1 | 12/2013 | Obayashi et al. |
| 2014/0007725 A1 | 1/2014 | Enghels |

FOREIGN PATENT DOCUMENTS

| | | |
|---|---|---|
| CN | 101333590 A | 12/2008 |
| CN | 101503786 A | 8/2009 |
| CN | 101962745 A | 2/2011 |
| CN | 104498867 A | 4/2015 |
| CN | 104805268 A | 7/2015 |
| EP | 1876256 A1 | 1/2008 |
| EP | 2505684 A1 | 10/2012 |
| GB | 1546092 A | 5/1979 |
| JP | 59150082 A * | 8/1984 ............... C23C 8/80 |
| JP | S59150082 A | 8/1984 |
| JP | H05255733 A | 10/1993 |
| JP | H06212271 A | 8/1994 |
| JP | H073324 A | 1/1995 |
| JP | H08311607 A | 11/1996 |
| JP | 2001059154 A | 3/2001 |
| JP | 2009242854 A | 10/2009 |

OTHER PUBLICATIONS

Obayashi, K., et al; Novel Heat Treatment Method Combining Vacuum Carburizing with Induction multi-step heat treatment process only 45% of the processing time of gas carburizing reduces energy consumption and CO~2 emissions by approximately half; International conference on gears; Europe invites the world Conference information Conference Date: 2010; Oct Conference location Munich, Germany.

The product roundup: The Product Roundup is a showcase of some of the best products technologies the L thermal-processing industry has to offer. Industrial Heat advanced, energy-efficient and cost-effective items in one special section; Publication title Industrial Heating, vol. 81, Issue 12, Publication date Dec. 2013.

* cited by examiner

LOW PRESSURE INDUCTION CARBURIZATION

TECHNICAL FIELD

The present disclosure generally relates carburization technologies.

BACKGROUND

The art of carburization has experienced several technological challenges over the years. One challenge relates to the cycle time required to create carburized articles. Currently, one industry standard and common way to case-harden articles of manufacture is by using the furnace carburization process. Articles are batched into a carburized atmosphere furnace, heated to the correct temperature and for the correct time to establish a specified case depth hardness. Before carburizing, articles are strategically/selectively plated with copper to avoid carburization of surfaces of the article that should not be hardened. A typical carburization heat treat process may take approximately 3-5 hours. If one includes the additional time required for plating, stripping, masking, sand blast, and final stripping processes, the overall cycle time may take 5 to 15 days. Further, furnaces are automated for material handling and running the correct heat treat recipe. Once the furnaces are started, they must run continuously to avoid damaging the fire brick interior and affect the furnace longevity. As such, furnace carburization technologies are time intensive and require significant unproductive energy.

Another challenge relates to the deformation of articles caused by the carburization process. Article manufacturers typical encounter part distortion due to the adverse effects caused from the heat treatment of parts during the case hardening and through hardening processes. Historically, heat treat distortion in articles has caused major yield issues and affects every step of the manufacturing process after heat treat. Typically, non-clean up (NCU), outer dimension (OD) undersized and inner dimension (ID) oversized are common part defects found on articles due to the heat treat process.

Accordingly, there remains a need in the art for carburization techniques that allow for relatively fast carburization of articles, and do not deform the articles. Furthermore, other desirable features and characteristics of the disclosure will become apparent from the subsequent detailed description and the appended claims, taken in conjunction with the accompanying drawings and this background of the disclosure.

BRIEF SUMMARY

The present disclosure relates to low pressure induction carburization. In one exemplary embodiment, a method for selective carburization of an article using low pressure induction carburization includes: providing or procuring an article including a surface; subjecting the article to directed induction heating, wherein a first portion of the surface of the article is inductively heated to a temperature that exceeds a carburizing temperature, while a second portion of the surface of the article remains at a temperature below the carburizing temperature; and simultaneously with subjecting the article to directed induction heating, subjecting the article to low pressure carburization, thereby selectively carburizing the first portion of the surface of the article while not carburizing the second portion of the surface of the article.

In another exemplary embodiment, an apparatus for low pressure induction carburization includes: a hermetic, low pressure carburization chamber fitted with an inlet port for receiving a carburizing gas; an article support base within the chamber; an article disposed or secured on the article support base; and an electromagnetic induction structure shaped and disposed with respect to the article to direct an electromagnetic field into a first portion of a surface the article for directed induction heating of the article, wherein the carburization chamber includes a low pressure carburizing gas that was received into the chamber through the inlet port, and wherein the first portion of the surface of the article is at a temperature in excess of a carburizing temperature This summary is provided to describe select concepts in a simplified form that are further described in the Detailed Description. This summary is not intended to identify key or essential features of the claimed subject matter, nor is it intended to be used as an aid in determining the scope of the claimed subject matter.

BRIEF DESCRIPTION OF THE DRAWINGS

The present disclosure will hereinafter be described in conjunction with the following drawing figures, wherein like numerals denote like elements, and wherein.

DETAILED DESCRIPTION

Figure 1:
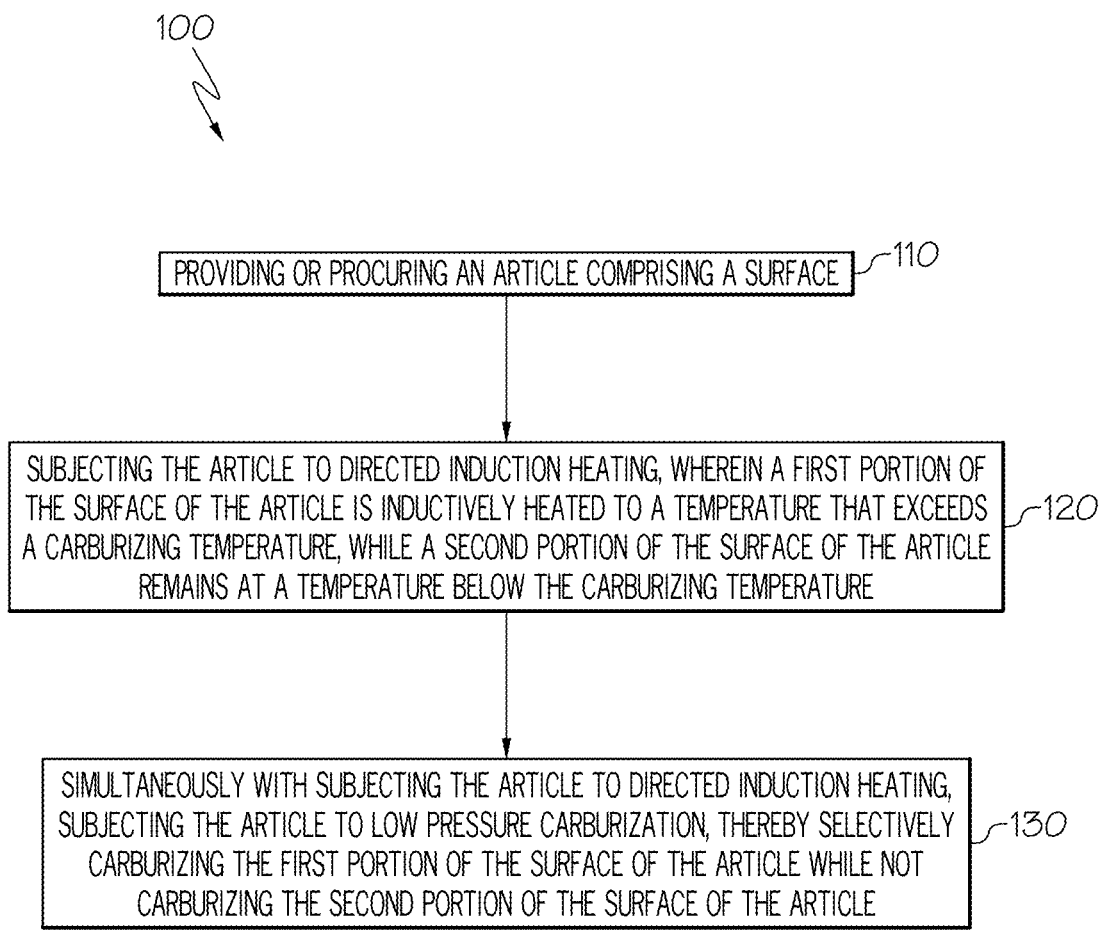
FIG. 1 is a flow diagram illustrating steps in a method for selective carburization of an article using low pressure induction carburization in accordance with embodiments of the present disclosure.

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

The present disclosure relates to the selective carburization of articles using low pressure induction carburization. As used herein the term "carburization" is intended to mean a heat treatment process in which iron or an iron alloy, such as steel, absorbs carbon liberated when the metal is heated in the presence of a carbon bearing material, such as acetylene, ethylene, methane, charcoal, carbon monoxide, etc., with the intent of making the metal harder. Depending on the amount of time and temperature, the affected area can vary in carbon content.

As used herein, the term "article" is intended to mean any object that is susceptible to the carburization process. Examples of these objects include, by way of non-limiting example, gears, shafts, plates, bearings, blades, fins, rods, valves, and coils, among many other possible examples. Susceptibility to carburization indicates that the object is made of a material that may be carburized, non-limiting examples of which include iron or the various iron alloys, of which a principle class thereof is steel.

As used herein, the term "selective carburization" refers to performing the carburization process as defined above less than an entirety of the surface area of an article as defined above. Thus, a selectively carburized article will have some portions of its surface that are carburized, and other portions of its surface that are not carburized. It is at the election of the skilled person to determine how the portions for carburizing are selected. In the example where the article is a toothed gear, it may be desirable only to carburize the "teeth" of the gear. In the example where the article is a valve, it may be desirable only to carburize the contact surfaces of the valve. Again, it is well within the grasp of the ordinarily skilled person to make this determination based on the form of the article and its intended used.

As used herein, the term "induction heating" refers to the process of heating an electrically conducting object by electromagnetic induction, through heat generated in the object by eddy currents (also called Foucault currents). An induction heater generally includes an electromagnet, and an electronic oscillator that passes a high-frequency alternating current (AC) through the electromagnet. The rapidly alternating magnetic field penetrates the object, generating electric currents inside the conductor called eddy currents. The eddy currents flowing through the resistance of the material heat it by Joule heating. In ferromagnetic (and ferrimagnetic) materials like iron, heat may also be generated by magnetic hysteresis losses. The frequency of current used depends on the object size, material type, coupling (between the work coil and the object to be heated) and the penetration depth. The heat by induction heating is generated inside the object itself, instead of by an external heat source via heat conduction. Thus, objects can be very rapidly heated. In addition there need not be any external contact with the object.

As used herein, the term "directed induction heating" refers to the use of an induction heating process as defined above to selectively cause heating in less than an entirety of an article as defined above. Thus, as a result of directed induction heating, some portions of the article will have heat generated therein, while other portions of the article will not have heat generated therein (more technically stated, some portions of the article will have eddy currents generated therein, while other portions of the article will not have eddy currents generated therein). Due to the laws of heat conduction, it should be anticipated that portions of the article that are not heated may nevertheless experience a rise in temperature. Yet, according to this definition of "direction induction heating," those portions that may experience a rise in temperature due to thermal conduction should not be understood as being encompassed within the portions of the article that have heat generated therein.

Directed induction heating may be accomplished through appropriate shaping of the electromagnet and appropriate positioning of the article with respect to the appropriately-shaped electromagnet. Some examples of electromagnet shapes include coils. (For simplicity, in the description that follows, based on colloquial use in the art, the electromagnetics will be referred to exclusively as "coils," although this disclosure should not be interpreted in an sense as requiring a "coil shape" as may be found in a classic dictionary definition of the word.) These coils may have a generally circular cross-section. Such an electromagnet is known to generate a relatively wide electromagnetic field. Changing the shape of the coil's cross-section may from generally circular to another shape, such as ovoid, quadrilateral, etc. would be expected to result in a more directed (i.e., less broad) electromagnetic field being generated, which is thus more conducive to the above-defined "directed induction heating." Moreover, the shaping of the length of the coil is also a consideration in directed induction heating. For example, length of the coil may be shaped such that it runs in proximately only to those areas of the article that are intended to be inductively heated. Using the example of a gear, it may be desirable to shape the length of the coil such that the coil runs proximate only to the teeth of the gear, and not proximate to portions of the gear that are radially inward from the teeth. Using the example of a valve, it may be desirable to shape the length of the coil such that the coil runs proximate only the contact portion of the valve. As such, using a combination of both shaping the cross-section of the induction coil and shaping the length of the induction coil, the purposes of directed induction heating may be achieved. Of course, given the numerous possible articles, sizes of articles, shapes of articles, and portions of articles to be inductively heated, it falls to the ordinary skill of the artisan to accomplish the shaping of the induction coil. Given the voluminous literature available in the art pertinent to induction heating, it is expected that the skilled artisan will be able to accomplish these ends for a particular article (and for heating desired portions of such article) with no more than moderate effort and experimentation.

As used herein, the term "low pressure carburization" refers to a carburization process as defined above that is carried out in near-vacuum conditions using hydrocarbon gases at very low pressure. The near-vacuum or very low pressure conditions referred to in this definition may be from about 5 mbar to about 20 mbar, such as about 7 mbar to about 13 mbar. These very low pressures are often accomplished in a hermetic chamber, the article being placed in such chamber. These very low pressures improve to absorption of carbon into the article. As an additional aspect, low pressure carburization generally includes the use of alternating injections of the carburizing gas (such as acetylene) and a neutral gas (such as molecular nitrogen) to assist in diffusion of the carbon into the article. Low pressure carburization also allows or increased carburizing temperatures to be used. Typically, carburization begins at about 1550° F. Low pressure carburization allows for carburization temperatures in excess of 1800° F., which is expected to significantly reduce the time needed to achieve the desired degree of carburization in the article.

As used herein, the term "cooling object" refers to any form, shape, size, material, or composition of article or object that is capable of removing heat from portions of the article as defined above, when placed in proximity to the article. As initially noted above, heat conduction can result in the increase in temperature at portions of the article not subjected to directed induction heating as defined above. Thus, to mitigate the effects of this heat conduction, it may be desirable to place a cooling object in proximity to those portions of the article that are not intended to be subjected to directed induction heating. The form, shape, size, material, or composition of the cooling object is entirely dependent on the size and shape of the article, and the size and shape of the portions thereof that are subjected to directed induction heating. Thus, it should be considered that those portions of the article not subjected to directed induction heating would be those amenable to having the cooling object placed in proximity thereto. Using the example of a gear wherein the teeth are inductively heated, the cooling object may take the form of a generally circular plate and may be placed proximate to those portions of the gear that are located radially inward from the teeth. More than one cooling object may be appropriately employed. For example, referring again to the gear, such plates may be placed on both lateral surfaces of the gear. The function of removal of heat may be accomplished by conduction, convection, or a combination of both. One example circulates a relatively cool (i.e., at a lower temperature than the article) fluid through the cooling object to allow for both conductive and convective removal of heat. Other examples may employ static (i.e., non-circulative) cooling via conduction only.

In accordance with the foregoing definitions, methods for selectively carburizing an article using low pressure carburization facilitated by directed induction heating are provided in this disclosure. As will be described in greater detail below, these methods are able to be performed faster than prior art methods because there is no need for masking the portions of the article that are desired not to be carburized (and consequently there is no need for the above described mask removal processes), and further the carburization processes itself is performed in an expedited manner. Moreover, these methods are able to be performed without worry of deforming the article as induction heating does not carry with it the risk of deformation that furnace heating does.

In accordance with some embodiments, these methods may include directed induction heating of the article. Such heating may be performed to achieve a carburizing temperature (e.g., in excess of 1550° F.) at desired portions of the article (particularly at the surface thereof). In accordance with some embodiments, these methods may include the use of a cooling object to maintain portions of the article other than the aforesaid desired portions of the article at temperatures below the carburizing temperature. Thus, selective carburization is readily accomplished only at those portions of the article subjection to the directed induction heating. Moreover, the carburization performed may be low pressure carburization. In this manner, the directed inductive heating of the article and the cooling of the article using the cooling object occurs in accordance with the above-defined parameters of low pressure carburization. It may be the case that the article, the electromagnetic coil, and the cooling object are all placed inside of a low pressure carburization (hermetic) chamber, wherein the electromagnetic coil and the cooling object are activated while the chamber is maintained at the very low pressure and while the alternating carburizing/neutral gasses are introduced in the chamber. In such a scenario, the inductively heated portions of the article will be carburized, and the cooled portions of the article will not be carburized, in accordance with the above-described principles of selective carburization. Thus, the methods described herein may appropriately be referred to as "low pressure induction carburization."

Referring now to FIG. 1, a method 100 for selective carburization of an article using low pressure induction carburization is illustrated in the form of a flow diagram. The method 100 diagram includes block 110, which sets forth a method step of providing or procuring an article including a surface. The method 100 diagram further includes block 120, which sets forth a method step of subjecting the article to directed induction heating, wherein a first portion of the surface of the article is inductively heated to a temperature that exceeds a carburizing temperature, while a second portion of the surface of the article remains at a temperature below the carburizing temperature. Still further, the method 100 diagram includes block 130, which sets forth a method step of simultaneously with subjecting the article to directed induction heating, subjecting the article to low pressure carburization, thereby selectively carburizing the first portion of the surface of the article while not carburizing the second portion of the surface of the article.

Variations and specific embodiments within the scope of the described method 100 are possible. For example, the article may be a gear including a plurality of teeth. As such, the first portion of the surface of the article may be the plurality of teeth and the second portion of the surface of the article may be a surface of the gear that is radially inward from the plurality of teeth. It may also be that the article is an iron alloy, such as steel. An additional step of the method may be, simultaneously with subjecting the article to directed induction heating, cooling the second portion of the surface of the article with a cooling object. Regardless of steps performed, in some embodiments, no part of the article, during the carburizing process, is masked with a masking coating layer that is coated on the article, such as a copper masking coating layer as described in the background of this disclosure, thereby avoiding the need to apply such coating layer in advance and also subsequently remove ("strip") this layer.

In further variations and specific embodiments, subjecting the article to low pressure carburization may include placing the article in a hermetic chamber. As such, directed induction heating may be accomplished with the use of an electromagnet, and the electromagnet may be placed in the hermetic chamber in proximate to the first portion of the surface of the article. The electromagnet may be provided in the form of a coil. The coil may have a non-circular cross-section. Further, a length of the coil may be shaped so as to run proximate to an entirety of the first portion of the surface of the article. Moreover, subjecting the article to low pressure carburization may include introducing into the hermetic chamber, in an alternating sequence, a carburizing gas and a neutral gas. The carburizing gas may be acetylene and the neutral gas may be molecular nitrogen. Further, subjecting the article to low pressure carburization may include subjecting the article to a pressure within the hermetic chamber that is from about 5 mbar to about 20 mbar, such as from about 7 mbar to about 13 mbar. Still further, the carburizing temperature may be about 1550° F.

Figure 2:
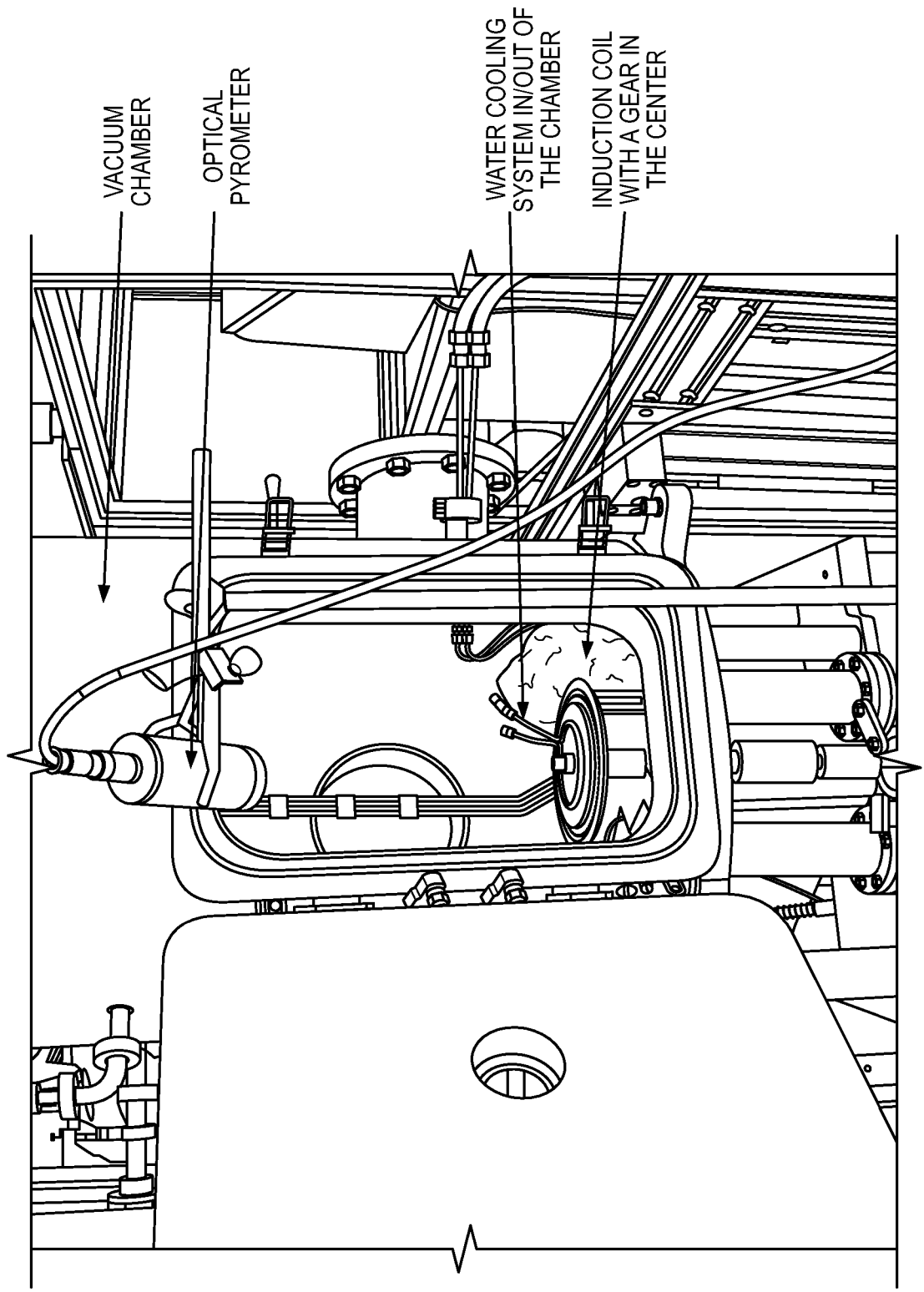
FIG. 2 illustrates an experimental test apparatus for testing selective carburization of a gear article using low pressure induction carburization in accordance with embodiments of the present disclosure.

In accordance with the foregoing method description, an example was prepared as proof-of-concept. The example is illustrated in FIGS. 2-5, which are described in greater detail below. A gear was selected as the example article, due to their relatively lower cost and ease of obtaining as compared to other possible article to test. One aspect of this example was to evaluate if copper plating, masking, stripping, and sandblast could be eliminated by using low pressure induction carburization from direct heating of gear teeth. As shown in FIG. 2, the testing equipment includes a vacuum system with a hermetic low pressure carburization chamber, a 20 Kw induction power supply, an optical pyrometer to monitor temperature, an electromagnetic induction coil so shaped at to allow the gear (particularly its teeth) to be encircled therein and being in proximity to the teeth, and a water circulation cooling object disposed both laterally above and below the gear at locations radially inward from the teeth.

Figure 3:
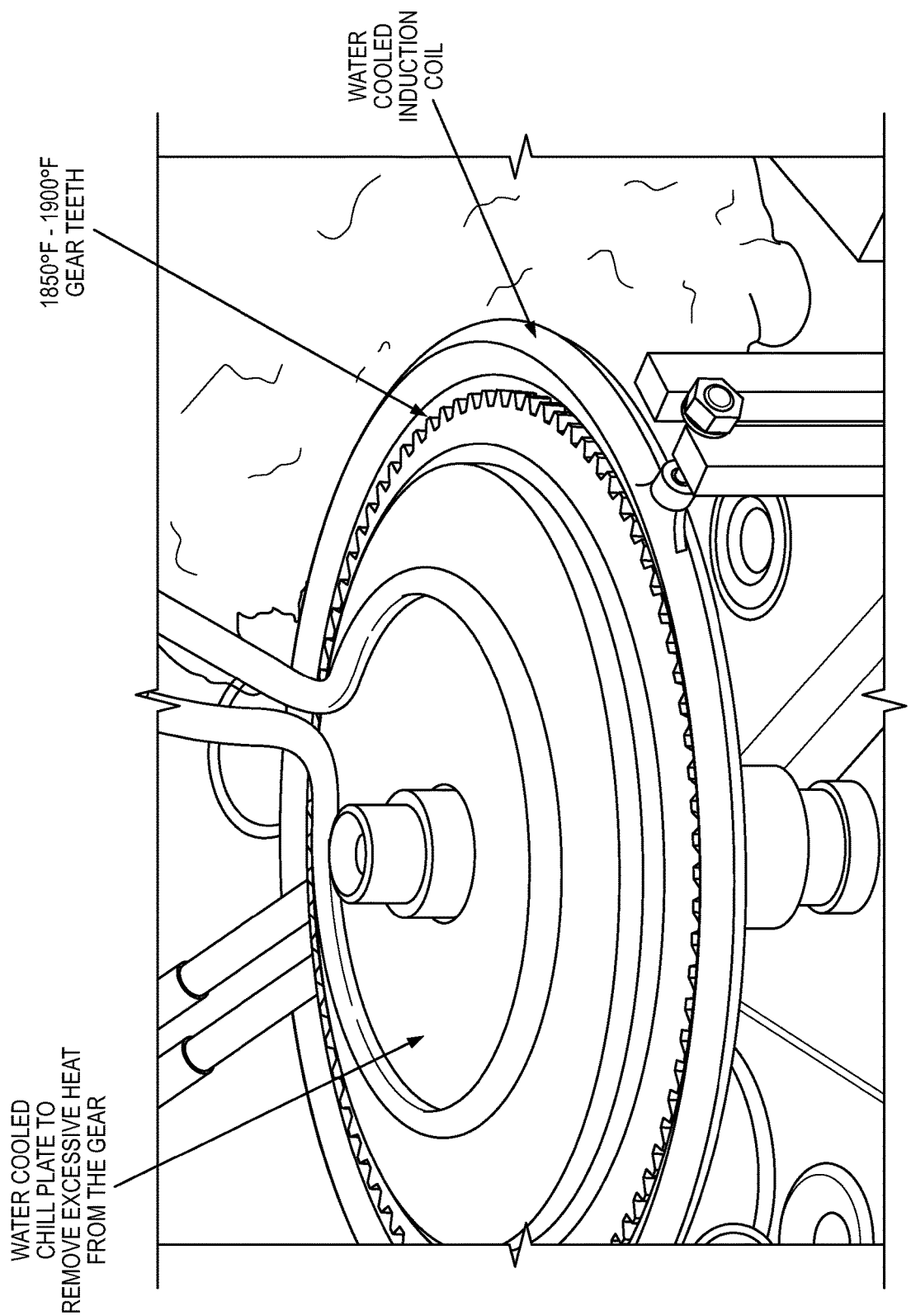
FIG. 3 illustrates heating of the gear using directed induction heating using the example apparatus of FIG. 2.

As shown in FIG. 3, the gear article was heated using a 20 Kw RF power supply and AC current through the induction coil. Electromagnetic energy was generated from the coil and caused current to flow through the portions of the article that were inside of the electric field. This was a non-contact process. Electromagnetic energy via eddy currents was directed into the gear teeth via the coil. The gear article was heated in a partial vacuum with an acetylene gas as a carbon supply, and nitrogen gas as the neutral gas supply. The gas pressure was about 5 torr. The gear teeth achieved a temperature, according to the optical pyrometer, that was between about 1850° F. and 1900° F. Portions radially inward form the gear teeth, and proximate to the circulating water cooling object, maintained temperatures less than about 1500° F.

Figure 4:
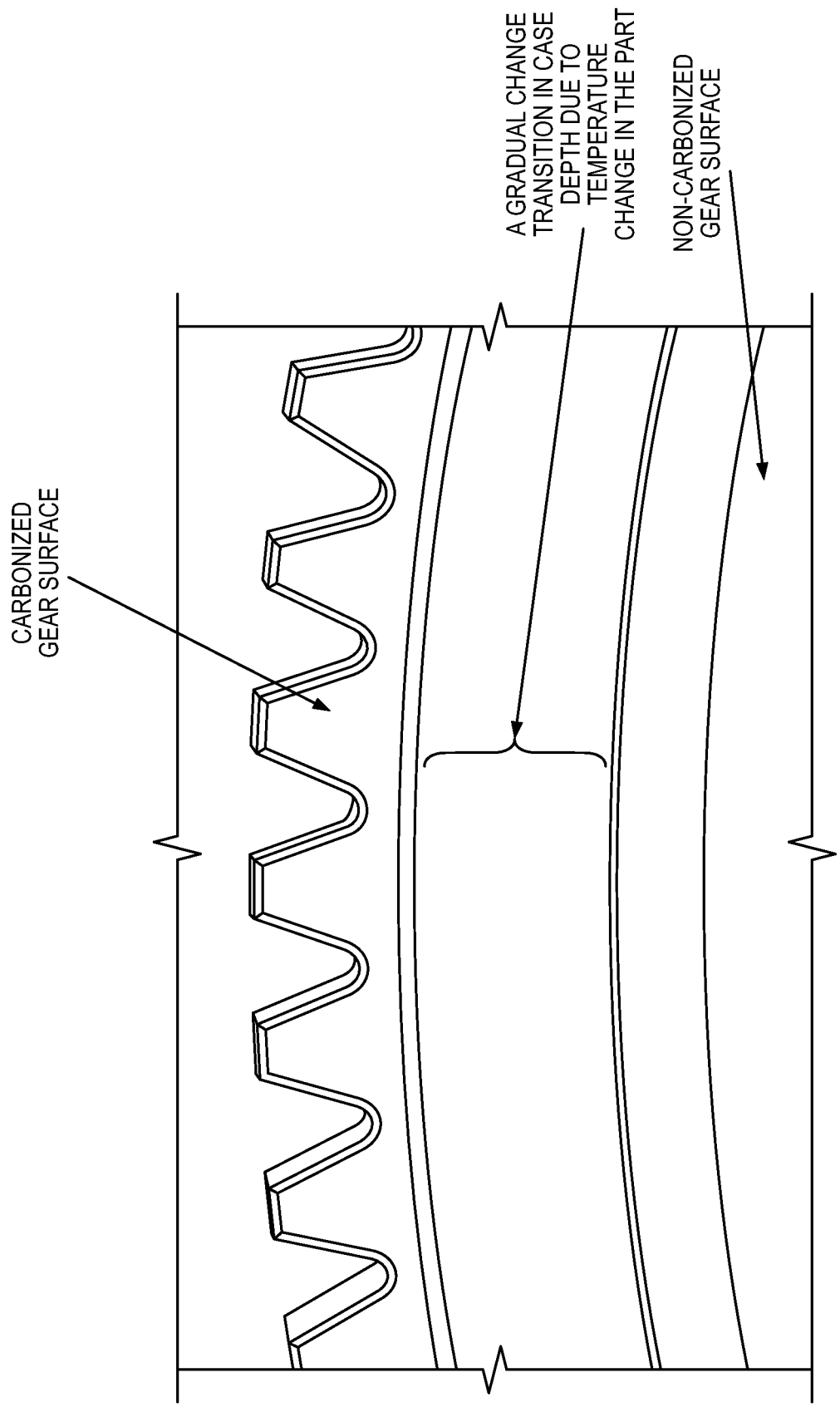
FIG. 4 illustrates a selectively carburized gear produced using directed induction heating and low pressure carburization using the example apparatus of FIG. 2.

As shown in FIG. 4, after a time period of 30 minutes (7 minutes of acetylene gas exposure, 23 minutes of neutral gas exposure diffusion time) at the stated temperatures in the low pressure carburization chamber, the gear article achieve a carburized case depth of 0.042 inches. The gear exhibited this carburized surface at the gear teeth. A "transition zone" of partial carburization was observed immediately radially inward from the teeth, for a distance of a few millimeters. Radially inward from the transition zone, no carburization was observed. In further testing, successful carburization was achieved using times of 20 minutes (7 minutes acetylene gas exposure, 13 minutes of neutral gas exposure diffusion time, resulting in 0.019 case depth) and 15 minutes (5 minutes acetylene gas exposure, 10 minutes of neutral gas exposure diffusion time, resulting in 0.015 case depth), as well. Thus, the proof-of-concept was achieved.

According to the foregoing example, an apparatus for low pressure induction carburization can readily be envisioned. The apparatus may include a hermetic, low pressure carburization chamber fitted with an inlet port for receiving a carburizing gas, an article support base within the chamber, an article disposed or secured on the article support base, and an electromagnetic induction structure (possibly a "coil") shaped in disposed with respect to the article to direct an electromagnetic field into a first portion of a surface of the article. In operation, the carburization chamber includes a low pressure carburizing gas that was received into the chamber through the inlet port, and the first portion of the surface of the article at a temperature in excess of a carburizing temperature. The apparatus may optionally include a cooling object disposed with respect to a second portion of the surface of the article, wherein, during operation, the second portion of the surface of the article is at a temperature below the carburizing temperature. Further, the apparatus may optionally include an additional inlet port for receiving a neutral gas.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method for selective carburization of an article using low pressure induction carburization comprising:
   providing or procuring an iron or iron alloy article comprising a surface;
   subjecting the article to directed induction heating, wherein a first portion of the surface of the article is inductively heated to a temperature that exceeds a carburizing temperature of about 1550° F. (about 843° C.), while a second portion of the surface of the article remains at a temperature below the carburizing temperature;
   simultaneously with subjecting the article to directed induction heating, cooling the second portion of the surface of the article with a cooling object that is placed on the second portion of the surface, wherein the cooling object provides both convective and conductive cooling to the second portion of the surface of the article; and
   simultaneously with subjecting the article to directed induction heating, subjecting the article to low pressure carburization, wherein subjecting the article to low pressure carburization comprises subjecting the article to a pressure that is from about 5 mbar to about 20 mbar (about 500 Pa to about 2000 Pa), thereby selectively carburizing the first portion of the surface of the article while not carburizing the second portion of the surface of the article.

2. The method of claim 1, wherein the article comprises a gear comprising a plurality of teeth.

3. The method of claim 2, wherein the first portion of the surface of the article comprises the plurality of teeth and wherein the second portion of the surface of the article comprises a surface of the gear that is radially inward from the plurality of teeth.

4. The method of claim 1, wherein subjecting the article to low pressure carburization comprises placing the article in a hermetic chamber.

5. The method of claim 4, wherein directed induction heating is accomplished with the use of an electromagnet, and wherein the electromagnet is placed in the hermetic chamber in proximate to the first portion of the surface of the article.

6. The method of claim 5, wherein the electromagnet is provided in the form of a coil.

7. The method of claim 6, wherein the coil comprises a non-circular cross-section.

8. The method of claim 6, wherein a length of the coil is shaped so as to run proximate to an entirety of the first portion of the surface of the article.

9. The method of claim 4, wherein subjecting the article to low pressure carburization comprises introducing into the hermetic chamber, in an alternating sequence, a carburizing gas and a neutral gas.

10. The method of claim 9, wherein the carburizing gas comprises acetylene ($C_2H_2$) and the neutral gas comprises molecular nitrogen ($N_2$).

11. The method of claim 1, wherein subjecting the article to low pressure carburization comprises subjecting the article to a pressure within the hermetic chamber that is from about 7 mbar to about 13 mbar (about 700 Pa to about 1300 Pa).

12. The method of claim 1, wherein no portion of the article, during the step of subjecting the article to low pressure carburization, is masked with a masking coating layer that is coated on the article.

13. The method of claim 1, wherein the cooling object circulates a cooling fluid.

* * * * *